United States Patent Office 3,520,915
Patented July 21, 1970

3,520,915
PROCESS FOR THE DEHYDROGENATION OF LOWER SATURATED ALIPHATIC NITRILES
Naoya Kominami, Tokyo, Kusuo Kawarazaki, Oimura, Saitama-ken, Masazumi Chono, Tokyo, and Hitoshi Nakajima, Urawa-shi, Japan, assignors to Asahi Kasei Kogyo Kabushiki Kaisha, Osaka, Japan, a corporation of Japan
Filed Oct. 20, 1966, Ser. No. 588,108
Claims priority, application Japan, Oct. 28, 1965, 40/65,722, 40/65,723; Feb. 22, 1966, 41/10,271
Int. Cl. C07c *121/32*
U.S. Cl. 260—465.9    6 Claims

ABSTRACT OF THE DISCLOSURE

A process for the preparation of acrylonitrile or methacrylonitrile by catalytic dehydrogenation which comprises contacting propionitrile or isobutyronitrile in the gaseous phase at a temperature between 300° C. and 700° C. with a catalyst which is a stannous oxide-silica complex formed by reacting a stannous halide with silica gel in an organic solvent at a temperature between 30° C. and 350° C., washing the stannous halide-silica reaction product with said organic solvent, hydrolyzing the resulting stannous halide-silica reaction product with an aqueous alkaline solution, removing the alkali substance and subjecting the resulting reaction product to heat treatment at a temperature between 300° C. and 700° C.

---

This invention relates to a process for the catalytic dehydrogenation of saturated lower aliphatic nitriles to produce unsaturated lower aliphatic nitriles containing the same number of carbon atoms. More particularly, the invention pertains to a method for producing acrylonitrile and methacrylonitrile by the respective catalytic dehydrogenation of propionitrile and isobutyronitrile.

It has heretofore been known that in the production of unsaturated aliphatic nitriles by the dehydrogenation of saturated aliphatic nitriles, various solid catalysts are effective (see, for example, U.S. Pat. Nos. 2,701,260, 2,734,909, 2,385,552 and 2,671,107). All such known catalysts, however, are not satisfactory in reaction (one pass yield and selectivity of unsaturated aliphatic nitriles) and in catalyst life. Particularly, these catalysts are short-lived and hence, after their activity has been lowered, they have to be oxidized with oxygen and to be freed from deposited carbon. Further, in order to prevent the lowering of catalyst-activity, there has been adopted a procedure by which a small amount of oxygen is added to the reaction gas. Even if such a procedure is adopted, however, the disadvantages in that the catalysts are low in selectivity and short in life are entirely un-acceptable from an industrial standpoint.

As a result of studies on catalysts capable of producing unsaturated aliphatic nitriles in high yields by the dehydrogenation of saturated aliphatic nitriles, it has been found that a stannous oxide catalyst, which has not been hitherto known, displays marked effects in the above reaction to give excellent results.

It is therefore a first process of the present invention to produce unsaturated aliphatic nitriles in high yields by the dehydrogenation of saturated aliphatic nitriles, characterized by the fact that the saturated aliphatic nitriles are subjected to gas phase catalytic dehydrogenation at a temperature within the range of from 300° to 700° C. in the presence of stannous oxide as catalyst.

When used alone as the catalyst for the dehydrogenation of saturated aliphatic nitriles, stannous oxide causes a lowering after a relatively short time of both formation activity and selectivity and unsaturated nitriles.

As a second process of the present invention, therefore, the inventors supported the stannous oxide on various carriers according to a conventional immersion method and found that the catalyst thus prepared, give unsaturated aliphatic nitriles in high yields and at high selectivities, and can maintain high formation-activity of unsaturated nitrile for a long period of time. In this case, the use of silica gel as the carrier is preferable, but the use of alumina, carbon or alumina-silica gel is also effective.

The stannous oxide-silica gel catalyst, thus prepared according to a conventional immersion method, maintains high activity for a period far longer than in the case where stannous oxide alone is used, but causes a lowering of selectivity of unsaturated aliphatic nitrile when the reaction has been continued for about 30 hours. It was further clarified that if $O_2$ or $O_2$— containing gas was introduced, at an elevated temperature, into the catalyst layer when the selectivity of the catalyst to unsaturated aliphatic nitrile had diminished due to such a long reaction time as indicated above, the selectivity was improved to a certain extent but was not completely restored.

In order to improve the above points, the inventors found as a third method of the present invention, a process for preparing a catalyst having such advantages that it retains high activity and selectivity for a far longer period of time than does the stannous oxide silica gel catalyst prepared according to the aforesaid immersion method and that if $O_2$ or an $O_2$-containing gas is introduced at an elevated temperature into the catalyst layer after the catalyst had been lowered in formation-activity of unsaturated aliphatic nitrile, particularly in selectivity as a result of a long reaction time, the catalyst is completely regenerated in respect to said selectivity.

That is, the catalyst of the present invention is prepared by reacting silica gel with a stannous halide at an elevated temperature in an organic solvent which dissolves the stannous halide but does not react therewith, to form a bond substance composed of said stannous halide and silica and overspread onto the surface of silica core, and neutralizing said substance with an aqueous alkali solution, followed by the removal of alkali.

The first to third processes of the present invention will be fully illustrated below.

When stannous oxide alone was used as a catalyst for the dehydrogenation of saturated aliphatic nitriles according to the first process of the present invention, the catalyst started to diminish in both the formation-activity and selectivity to unsaturated aliphatic nitriles after about 2 hours from the inception of the reaction. When the catalyst was subjected at this point to X-ray analysis, the presence of a considerable amount of metallic tin was observed in the catalyst. Subsequently, an $O_2$-containing gas was introduced at an elevated temperature into the catalyst whereby the presence of stannic oxide was observed in the catalyst. When said $O_2$-treated stannous oxide catalyst was used for the dehydrogenation of saturated aliphatic nitriles, it was observed that the formation-activity and selectivity to unsaturated aliphatic nitriles of the catalyst had been regenerated to a considerable extent, but both were inferior to those of fresh catalyst; that is, the activity of said catalyst had not been completely regenerated. On the other hand, when the reaction was effected in the presence of metallic tin or stannic oxide as catalyst, it was found that said catalyst was greatly lower than stannous oxide in formation-activity and selectivity to unsaturated aliphatic nitriles.

As the second process of the present invention, the dehydrogenation of saturated aliphatic nitriles was effected using a stannous oxide-silica gel catalyst, prepared according to the immersion method, for 30 hours under the same reaction conditions as in the case where stannous oxide alone was used as catalyst, and said stannous oxide-silica gel catalyst was subjected to X-ray analysis to find that metallic tin, which was considered to have been formed by reduction, was present in the catalyst.

From the above experimental results, the present inventors recognized that the diminution in catalyst activity of the sole stannous oxide catalyst, which had been used in the reaction, was ascribable to the fact that a certain portion of the stannous oxide employed was converted, during the reaction or regeneration, into metallic tin and stannic oxide which are lower than the stannous oxide in formation-activity and selectivity to unsaturated aliphatic nitrile. In the case of the stannous oxide-silica gel catalyst prepared according to the immersion method, there was present in part, free stannous oxide unsupported on the silica gel and said free stannous oxide was converted to metallic tin which is low in formation-activity and selectivity to unsaturated aliphatic nitriles, whereby the formation-activity and selectivity to unsaturated aliphatic nitriles of the catalyst were lowered.

Therefore, according to the third process of the present invention, the dehydrogenation of saturated aliphatic nitriles was effected in the presence of a catalyst prepared by reacting and bonding a stannous halide with silica gel onto the surface of a silica core at an elevated temperature and then neutralizing the resulting bonded substance with an aqueous alkaline solution, whereby examination of the catalyst by X-ray analysis indicated the presence of no metallic tin even after prolonged use. As a result it has thus been found that there is present in the catalyst, no free stannous oxide which is liable to be reduced to metallic tin during the dehydrogenation.

It is considered that the stannous oxide-silica catalyst prepared according to the bond method, as mentioned above, is formed by the following reaction mechanism and has a $\text{(Si—O—Sn—O)}_n$ linkage onto the surface of the silica core:

Si—OH + SnCl₂ (in acetophenone solution)
⟶ Si—O—SnCl $\xrightarrow{\text{NH}_4\text{OH}}$ Si—O—SnOH
$\xrightarrow{\text{heat treatment}}$

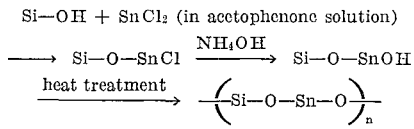

The stannous oxide thus bonded with silica and coated on the surface of a silica core is reduced only with great difficulty and thus is not converted into metallic tin during the reaction, so that the catalyst suffers from no diminution in formation-activity and selectivity to unsaturated aliphatic nitriles.

Further, the $\text{(Si—O—Sn—O)}_n$ catalyst prepared according to said bond method contains stannous oxide in an amount as little as about several weight percent based on the silica and hence can be said as a markedly advantageous catalyst from an industrial standpoint.

The state of the respective catalysts prepared according to the first, second and third processes before and after reaction were investigated by X-ray analysis. In the accompanying drawings, FIGS. 1–5 show the X-ray diagram.

Figure 1:
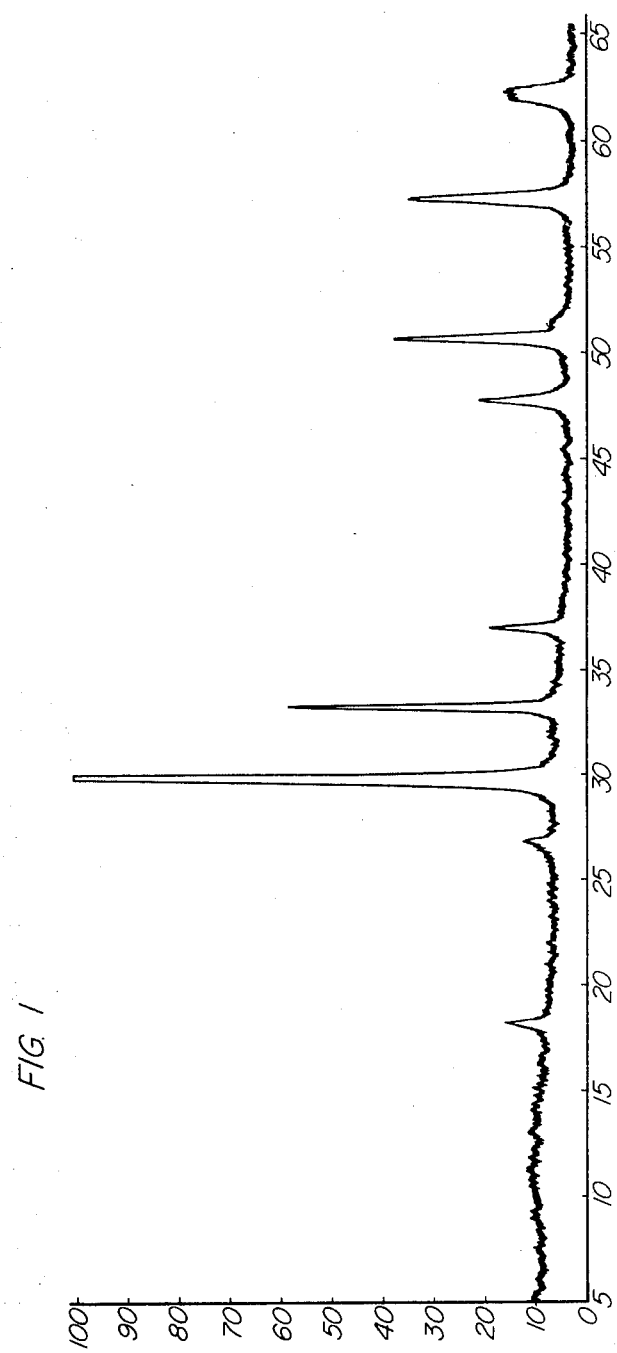
FIG. 1 is the pattern for stannous oxide catalyst (before reaction)

In FIG. 1, all the peaks are the diffraction patterns of stannous oxide, and thus stannous oxide shows considerably sharp peaks. During the reaction, however, stannous oxide is substantially reduced to metallic tin to become a silvery white metal.

However the stannous oxide employed in the above measurement was commercial reagent.

Figure 2:
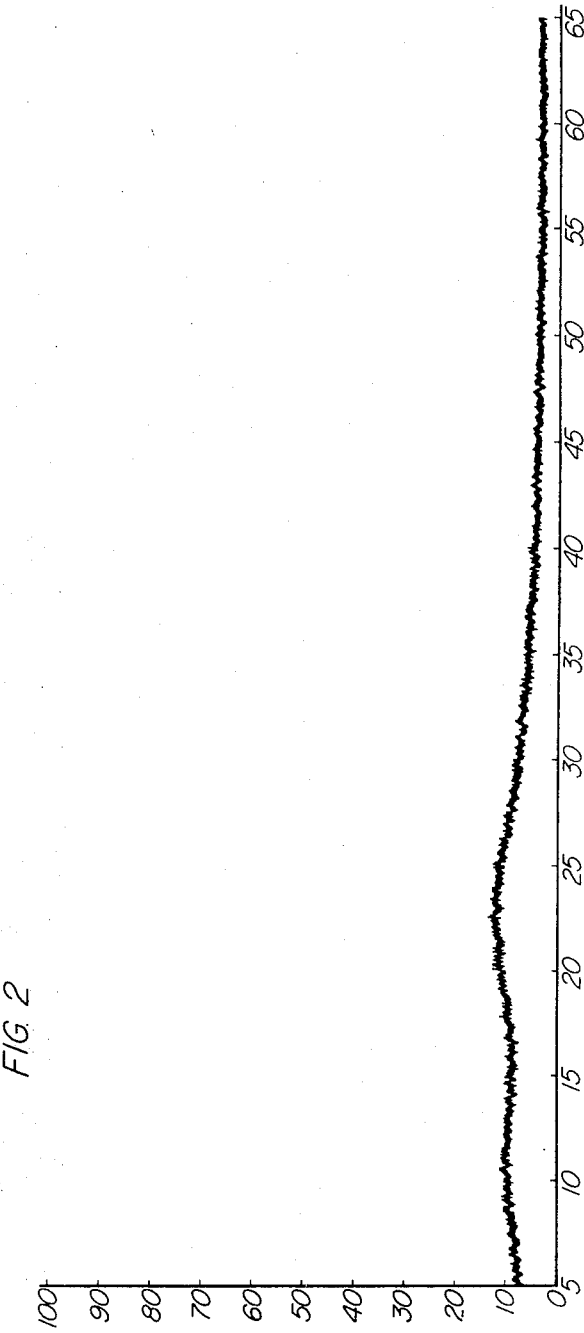
FIG. 2 is the pattern for stannous oxide-silica gel catalyst prepared according to immersion method (before reaction)

In FIG. 2, no diffraction pattern of stannous oxide is observed, because the amount of stannous oxide supported on the silica gel was not more than several percent and stannous oxide was uniformly dispersed, and only dim peaks of silica gel are observed at portions from $2\theta=15°$ to $2\theta=30°$. It is considered because the silica gel was in a substantially amorphous state that it showed such dim and vague peaks as seen in FIG. 2. On the other hand, in FIG. 3, 8 to 10 peaks of metallic tin are seen in addition to the dim peaks of silica gel at portions from $2\theta=15°$ to $2\theta=30°$. This is ascribable to the fact that the stannous oxide is merely supported on the silica gel and therefore the major proportions of the stannous oxide and silica gel are not chemically bonded, with the result that the stannous oxide is unstable and is reduced during the reaction to metallic tin.

Figure 4:
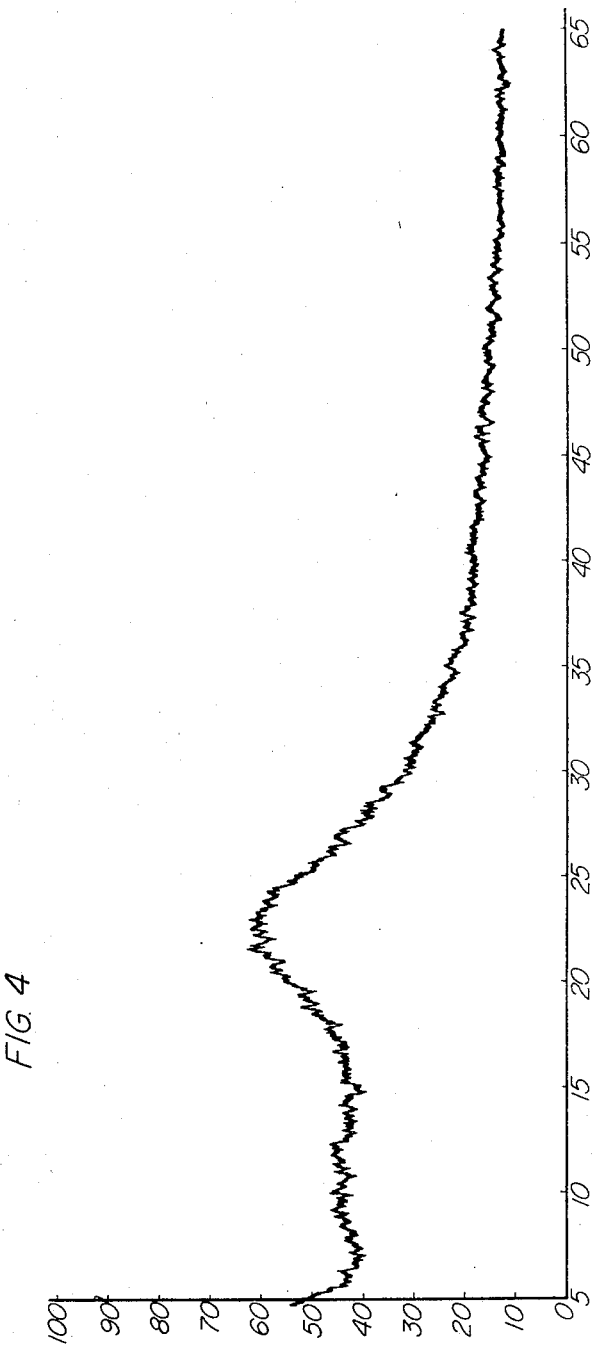
FIG. 4 is the pattern for stannous oxide-silica catalyst prepared according to the bond method (before reaction) and FIG. 5 is the pattern for the catalyst of FIG. 4 but after reaction.
Figure 5:
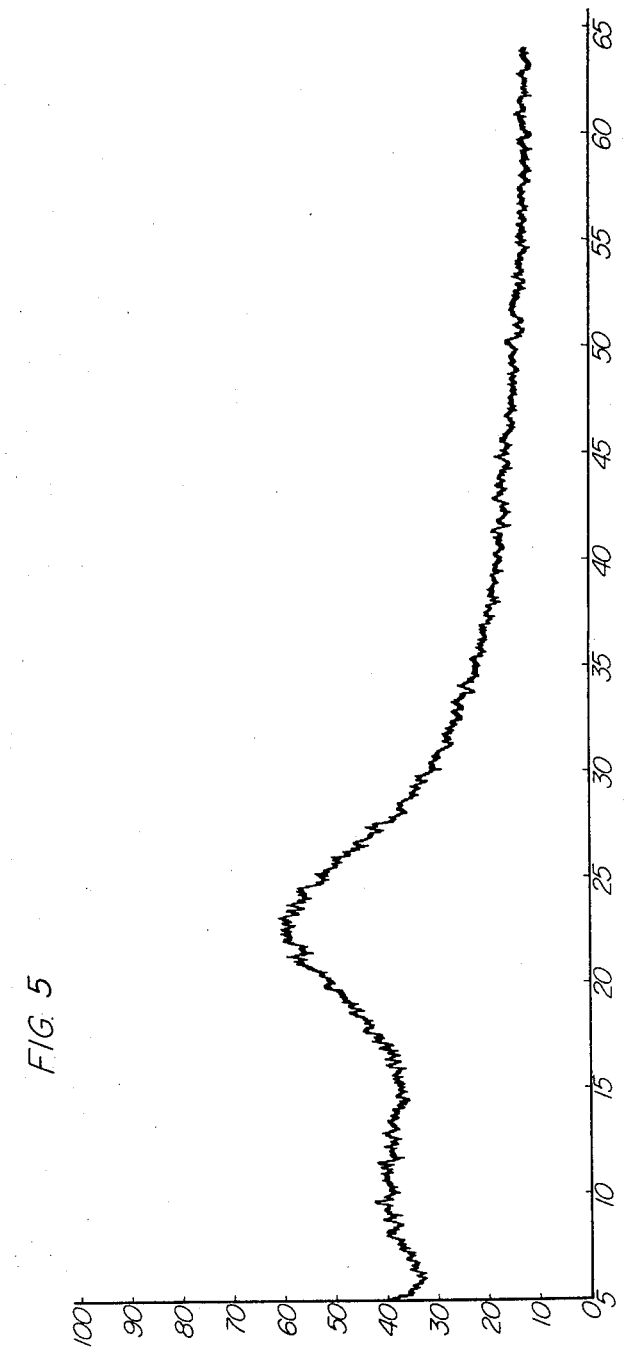

In FIGS. 4 and 5, only the dim peaks of silica are seen at portions from $2\theta=15°$ to $2\theta=30°$, and no diffraction pattern for stannous oxide or metallic tin is observed. Since FIGS. 4 and 5 are X-ray diffraction patterns of compounds which are the same in crystal structure, it is considered that the stannous oxide-silica catalyst prepared according to the bond method is not reduced even during the reaction and that, in the catalyst, the stannous oxide and silica have been chemically bonded, i.e. the stannous oxide has been bonded with silica and overspread onto the surface of a silica core substantially in the form of a monomolecular layer.

Figure 3:
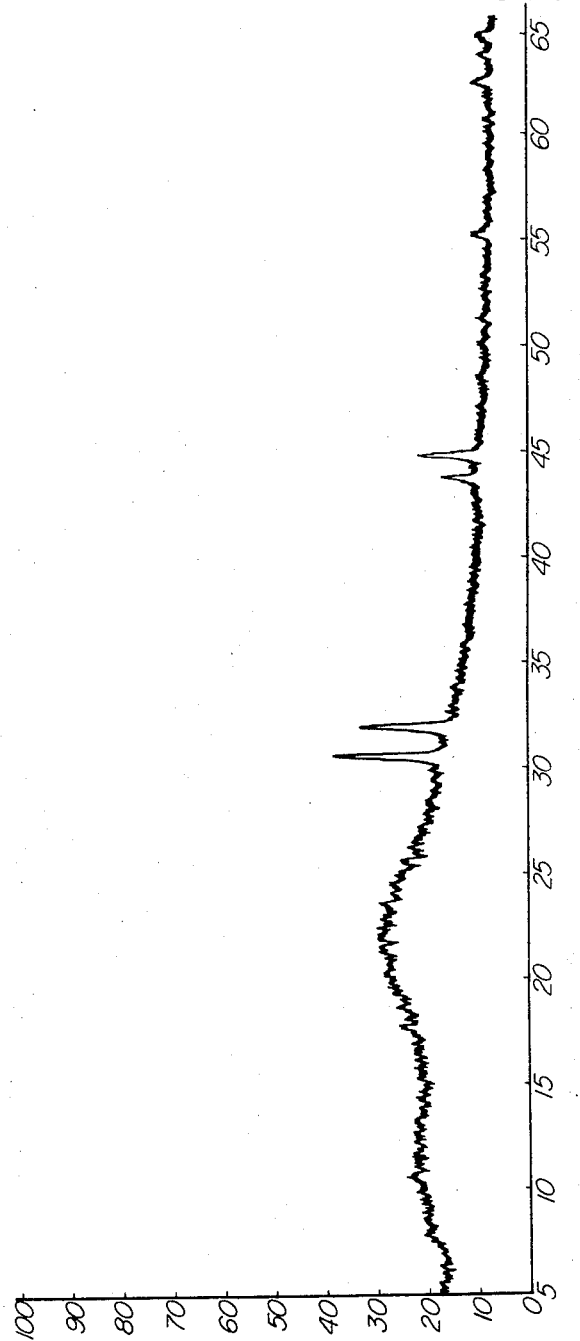
FIG. 3 is the pattern for the catalyst shown in FIG. 2 but after reaction.

FIGS. 4 and 5 shows the results of measurements effected at two times the X-ray sensitivity of the measurements in the case of FIGS. 1, 2 and 3.

Figure 6:
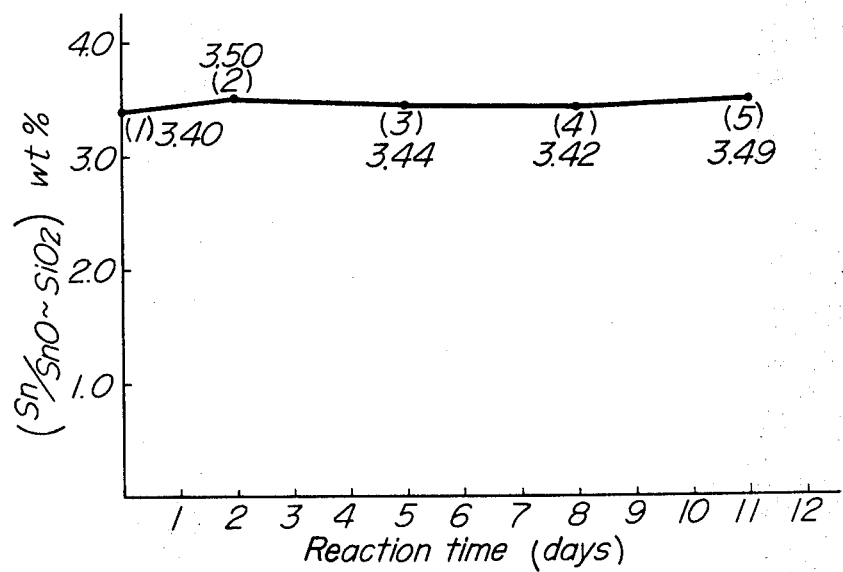
FIG. 6 shows the elemental analysis of tin before and after reaction to illustrate the long catalyst activity-retaining state of stannous oxide-silica catalyst prepared according to the bond method.

As is clear from FIG. 6, no change in weight percent of Sn/SnO-SiO₂ was observed even after 11 days (264 hours) had elapsed from the initiation of the reaction. From this fact, it is considered that in the case of this catalyst, no stannous oxide escapes during the reaction. Since if stannous oxide were independently present on the silica core, a part of the stannous oxide would escape during the reaction, because the reaction temperature is from 300° to 700° C.

In view of the results shown in FIGS. 4, 5 and 6, it is considered that the stannous oxide-silica catalyst prepared according to the bond method has a stable structure such as $\text{(Si—O—Sn—O)}_n$.

It has also been found that the formation of carbon dioxide or monoxide is observed when O₂ or an O₂-containing gas is introduced into the catalyst which has been lowered in catalyst-activity after a long reaction time, and the catalyst-activity is completely recovered when no formation of carbon dioxide or monoxide is observed any more. Therefore, when they are lowered in catalyst-activity resulting from long reaction time, the catalysts prepared in each of the processes can be readily regenerated by introducing O₂, O₂-containing gas (e.g. air), steam or carbon dioxide to the catalyst at an elevated temperature.

The stannous oxide to be employed as the catalyst in the first process of the present invention may be one prepared according to known procedures. In addition, hydroxides and salts capable of converting into stannous oxide under the reaction conditions, such as for example, nitrates, acetates and carbonates, may also be used.

In the second process of the invention, the stannous oxide to be used as a component of the stannous oxide-silica gel catalyst prepared by the immersion method is the same as in the first process. As the silica gel, any commercial silica gel may be used. Further, if other carriers, e.g. alumina, alumina-silica gel or carbon, are to be used, those which are commercially available may be employed as such.

In the third process of the invention, the stannous halide to be used is any tin salt such as stannous chloride, stannous bromide, stannous iodide and stannous fluoride. In view of economy and ease of handling, however, the use of stannous chloride is particularly preferable. The solvent employed is required to be one which dissolves the stannous halides but which does not react therewith. For example, an ester, ketone or ether, preferably a ketone is used. The ester includes methyl acetate, ethyl acetate, propyly acetate, isobutyl acetate, phenyl acetate, benzyl acetate, methyl butyrate, ethyl butyrate and isoamyl butyrate; the ketone include acetone, methylethylketone, acetophenone and benzophenone; and the ether include diphenyl ether, dioxane and anisole. The reaction temperature and reaction time employed in the reaction of the stannous halide with silica gel vary depending on the kind of stannous halide and organic solvent used. In general, however, the reaction temperature is within the range of from 30° to 350° C., preferably from 50° to 200° C. If the reaction temperature is lower than said range, the rate of reaction of stannous halide with silica gel is low, and the amount of stannous halide reacted with said silica gel is small even if the reaction is continued for a long period of time, as a result of which the catalyst-activity is low. The reaction time varies depending on the reaction temperature adopted, but is ordinarily more than 3 minutes, preferably more than 30 minutes. The reaction is effected at atmospheric pressure.

The resulting bonded substance composed of stannous halide and silica coated on the surface of a silica core is required, after separation of the organic solvent used, to be neutralized with an aqueous alkali solution. It is preferred to wash the substance with an organic solvent, or with a solvent capable of dissolving the stannous halide prior to the neutralization, though it is not essential, in order to completely remove the liberated tin salt.

The aqueous alkali solution to be used for the neutralization may be any of aqueous ammonia solution, aqueous alkali metal hydroxide solutions, aqueous alkaline earth metal hydroxide solutions, aqueous alkali metal carbonate solutions and aqueous alkali metal bicarbonate solutions, such as for example, aqueous solutions of sodium hydroxide, potassium hydroxide, calcium hydroxide, sodium carbonate, potassium carbonate, sodium bicarbonate and potassium bicarbonate. The use of aqueous ammonia solution is particularly preferred. These alkaline substances, when left in the catalyst, bring about a diminution in selectivity to unsaturated aliphatic nitriles, and therefore the removal thereof is desirable. When an aqueous ammonia solution, among the above-mentioned aqueous alkali solutions, is used, the ammonia is volatilized and removed in evaporating the catalyst to dryness. However, if other aqueous alkaline solutions are used, the alkali components thereof should be removed by suitable means such as washing with water or heating.

The thus prepared catalyst is preferably pre-treated at the time of reaction at an elevated temperature within the range of from 300° to 700° C., preferably from 500° to 650° C.

When the dehydrogenation reaction is effected for a long time in the absence of oxygen using the sole stannous oxide catalyst according to the first process of the present invention, the catalyst is gradually reduced and is therefore deprived of its formation-activity of unsaturated aliphatic nitrile. Therefore, the starting gas (saturated aliphatic nitriles), employed in the reaction is incorporated with $O_2$ or $O_2$-containing gas (e.g. air) in order to maintain the catalyst activity for a long time. In this case, the amount of oxygen to be incorporated is preferably within the range of from 2 to 30% based on the saturated aliphatic nitrile employed. Alternatively, the reaction may be continued without incorporating oxygen in the starting gas, and when the catalyst component is gradually reduced and is lowered in formation-activity of unsaturated aliphatic nitrile, the reaction is discontinued and oxygen is introduced into the catalyst at an elevated temperature to oxidize the reduced catalyst and to remove deposited carbon, whereby the catalyst-activity is regenerated. In such as case, it is desirable to subject the catalyst to hydrogen treatment after the oxygen treatment, because the oxygen absorbed onto the catalyst can be removed by the hydrogen treatment.

When diminished in activity, the stannous oxide-silica catalyst prepared according to the bonding method of the third process of the present invention may be regenerated by reducing it with the use of one or more members selected from the group consisting of $O_2$, air, steam, carbon dioxide and the like oxygen-containing gases.

In the first, second and third processes of the present invention, regeneration of the catalyst which has been lowered in activity may be effected at a temperature within the range of from 250° to 700° C., preferably from 450° to 600° C. At a temperature lower than said range, the formed carbon does not burn completely and thus the regeneration is not complete, while at a temperature higher than said range, undesirable sintering of the catalyst occurs. A similar procedure may be applied to the catalyst of the second process.

In practice, the stannous oxide-silica catalyst prepared according to the bonding method of the third process of the present invention, when lowered in activity due to the dehydrogenation of saturated aliphatic nitriles, may be regenerated either by discontinuing the reaction and introducing $O_2$ or an $O_2$-containing gas into the reaction tube, or by discontinuing the reaction, withdrawing the catalyst and regenerating it by use of a separate regenerating apparatus. Alternatively, if the type of reaction for the unsaturated aliphatic nitrile production is of the moving bed or fluidized bed type, the catalyst may be continuously withdrawn, regenerated and reused. Thereafter, the catalyst is preferably treated with hydrogen.

For the advantageous practice of each process of the present invention, the reaction temperature is within the range of from 300° to 700° C., preferably from 500° C. to 650° C. If the reaction temperature is less than 300° C., the dehydrogenation of the saturated aliphatic nitrile scarcely occurs, while if the temperature is excessively high, the decomposition of the product unsaturated aliphatic nitrile and the starting saturated aliphatic nitrile are undesirably effected.

In practicing the process of the present invention, a starting saturated aliphatic nitrile may be diluted with an inert gas such as nitrogen according to the known procedure. It is also possible to dilute the same with carbon dioxide, ethylene, benzene or hydrogen cyanide.

The reaction may be effected either under pressure, at atmospheric pressure or under reduced pressure, so long as the reaction system is maintained in the gas phase. However, the lower the pressure, the higher the one pass yield of unsaturated aliphatic nitrile, in general. Considering said one pass yield, therefore, the adoption of a low pressure is preferable. The space velocity of the reaction gas is preferably from 20 to 100,000 hr.$^{-1}$.

Further, the reaction apparatus to be employed in the present invention may be any of a fixed bed, moving bed or fluidized bed.

The following examples illustrate the present invention:

EXAMPLE 1

0.005 mole of commercial stannnous oxide as catalyst was diluted with 3 ml. of quartz sand and charged to a quartz-glass reaction tube. The reaction tube was heated to 530° C. in a tubular electric furnace, and a mixed gas comprising 19.5% of propionitrile and 80.5% of nitrogen was fed to the reaction tube at a space velocity of 9000 hr.$^{-1}$.

The exit gas composition was measured by gas chromatography to obtain the following results: propionitrile conversion: 23.8% one pass yield of acrylonitrile: 20.0% and selectivity thereof: 83.5%. The remainder was acetonitrile and carbon dioxide, and a little hydrogen cyanide and ethylene were also detected.

EXAMPLE 2

0.005 mole of commercial stannous oxide as catalyst was diluted with 3 ml. of quartz sand and charged to the same reaction tube as in Example 1. The reaction tube was maintained at 530° C., and a mixed gas comprising propionitrile, oxygen and nitrogen in a volume ratio of 18.7:40.0:77.3 was fed to the reaction tube at a space velocity of 9000 hr.$^{-1}$.

The reaction results were: propionitrile conversion: 28.5%, one pass yield of acrylonitrile: 21.5% and selectivity thereof: 75.4%.

The above catalyst activity was still maintained even after 30 hours from the beginning of the reaction.

EXAMPLE 3

The same reaction as in Example 1 was effected, except that there were used catalysts prepared by supporting 0.005 mole of each of tin carbonate and tin hydroxide on 3 ml. of quartz sand, respectively.

Immediately after the initiation of the reaction, the activity of each catalyst was scarcely observed, but the activity gradually increased and reached a constant after about 3 hours. The reaction results obtained in the above cases are shown in the following table.

| Catalyst | Propionitrile conversion, percent | One pass yield of acrylonitrile | Acrylonitrile selectivity |
|---|---|---|---|
| Tin carbonate | 23.3 | 19.8 | 84.9 |
| Tin hydroxide | 23.7 | 20.0 | 84.6 |

EXAMPLE 4

0.005 mole of commercial stannous oxide was diluted with 3 ml. of quartz sand and charged to a quartz-glass reaction tube. The reaction tube was heated to 590° C. in a tubular electric furnace, and a mixed gas comprising 36.0% of isobutyronitrile and 54.0% of nitrogen was fed to the reaction tube at a space velocity of 1500 hr.$^{-1}$.

The reaction results after a reaction time of 30 minutes at 590° C. were: isobutyronitrile conversion: 15.5%, methacrylonitrile one pass yield: 11.4% and methacrylonitrile selectivity: 73.2%. As by-products, there were obtained small amounts of acetonitrile, hydrogen cyanide and acrylonitrile.

EXAMPLE 5

A stannous oxide-silica gel catalyst was prepared according to the immersion method in the following manner:

30 ml. of silica gel were added to an aqueous solution containing 0.02 mole of stannous chloride. To the mixture, about 100 ml. of an aqueous ammonia solution were added to form a hydroxide. The formed precipitate was washed with water, evaporated to dryness and then thermally treated at 500° C. for 2 hours in a nitrogen current.

3 ml. of the thus prepared catalyst was charged to a quartz-glass reaction tube. The reaction tube was heated to 550° C. in a tubular electric furnace, and a mixed gas comprising 13.1% of propionitrile and 86.9% of nitrogen was fed to the reaction tube at a space velocity of 1400 hr.$^{-1}$.

The reaction results after 30 minutes of reacting were: propionitrile conversion 26.7%, one pass yield of acrylonitrile: 23.4%, and selectivity thereof: 87.5%. The remainders were acetonitrile, hydrogen cyanide and ethylene.

The reaction results after 30 hours of reacting were entirely the same as above and no diminution of catalyst activity was observed.

EXAMPLE 6

3 ml. of a stannous oxide-silica gel catalyst prepared according to the immersion method in the same manner as in Example 4 were charged to a quartz-glass reaction tube. The reaction tube was heated to 600° C. in a tubular electric furnace and a mixed gas comprising 36.0% of isobutyronitrile and 54.0% of nitrogen was fed to the reaction tube at a space velocity of 1400 hr.$^{-1}$.

The reaction results after 30 minutes from the commencement of the reaction at 600° C. were: isobutyronitrile conversion: 16.8%, methacrylonitrile one pass yield: 12.1%, and methacrylonitrile selectivity: 72.1%. As by-products, there were obtained small amounts of acetonitrile, hydrogen cyanide and acrylonitrile. Further, the reaction results after 35 hours from the commencement of a reaction were entirely the same as above, and no diminution in catalyst activity was observed.

EXAMPLE 7

0.02 mole of stannous chloride was charged to a three-necked flask provided with a stirrer, a cooler and a thermometer and same was dissolved in 100 ml. of acetophenone. To the resulting solution were added 50 ml. of silica gel (Davison grade: 70, mesh size: 10). The mixture was reacted, with stirring, at 160°–170° C. for 5 hours. After completion of the reaction, the solvent was removed, and the silica gel reaction product was washed 5 times with acetone by repeated decantation. 100 ml. of aqueous ammonia solution were added to the silica gel reaction product, and the mixture was heated and reacted on a water bath with heating and was evaporated to dryness. The obtained reaction product was thermally treated at 550° C. for 3 hours in a nitrogen atmosphere to prepare a catalyst for propionitrile dehydrogenation. Using the stannous oxide-silica gel catalyst thus prepared according to the above bonding method, the dehydrogenation of propionitrile was effected under the following reaction conditions: reaction temperature of 560° C., propionitrile to nitrogen ratio of 9:60 and a space velocity of 1400 hr.$^{-1}$. The reaction results were: propionitrile conversion: 19.5%, one pass yields of acrylonitrile and hydrogen cyanide: 17.1% and 2.3%, respectively, and acrylonitrile selectivity: 87.5%.

The reaction results hardly changed, even after 100 hours from the commencement of the reaction, and no diminution in activity of the catalyst was observed. When the activity of the catalyst had been decreased after 250 hours of use in propionitrile dehydrogenation, the feeding of propionitrile was discontinued and air was introduced at a temperature of 550° C. and a rate of 60 ml./min. After about 2 hours of introduction of air at that rate, about no formation of carbon dioxide was observed. At this point, the introduction of air was discontinued and the dehydrogenation of propionitrile was again effected under the same conditions as above. The propionitrile conversion, acrylonitrile one pass yield and acrylonitrile selectivity before the catalyst regeneration treatment were 17.7%, 11.5% and 65.3%, and those after said treatment were 20.7%, 18.8% and 91.0%, respectively.

EXAMPLE 8

0.02 mole of stannous bromide was charged to the same flask as in Example 5 and same was dissolved in 100 ml. of diphenyl ether. To the solution, 50 ml. of the same silica gel as in Example 5 were added and the mixture was reacted with stirring at about 200° C. for 4 hours. After completion of the reaction, the solvent was removed, and the silica gel reaction produce was washed 5 times with said solvent by decantation. To this silica gel reaction product, 100 ml. of aqueous ammonia solution were added and the mixture was heated and reacted on a water bath. After drying, the reaction mixture was thermally treated at 570° C. for 3 hours in a nitrogen current to prepare a catalyst for propionitrile dehydrogenation.

Using the catalyst prepared according to the above bonding method, the dehydrogenation of propionitrile was effected under the same conditions as in Example 1. The reaction results were: propionitrile conversion: 21.3%, acrylonitrile one pass yield: 18.8% and acrylonitrile selectivity: 88.4%.

In the above reaction, the activity of the catalyst did not change and no diminution in activity was observed even after more than 120 hours had elapsed from the beginning of the reaction.

The reaction was continued for about 200 hours and when the catalyst had diminished in activity, the propionitrile dehydrogenation was discontinued and steam was introduced at 550° C. for 2 hours to effect regeneration of its catalyst. After the regeneration treatment, the acrylonitrile formation activity of the catalyst was completely restored to the initial activity, and the acrylonitrile selectivity was not different from the initial value thereof.

EXAMPLE 9

0.02 mole of stannous chloride was charged to the same flask as in Example 7 and same was dissolved in 100 ml. of benzyl acetate. To the solution, 50 ml. of the same silica gel as in Example 5 were added and the mixture was reacted at about 140° C. for 6 hours in the same manner as in Example 7. After completion of the reaction, the solvent was removed and the silica gel reaction product was washed 5 times with said solvent by decantation. To this silica gel reaction product, 100 ml. of an aqueous potassium hydroxide solution were added, and the mixture was stirred. The reaction product was washed with water until no alkalinity was observed. The reaction product was dried and then thermally treated at 550° C. for 3 hours in a nitrogen current to prepare a catalyst for propionitrile dehydrogenation.

Using this catalyst, the dehydrogenation of propionitrile was effected for 100 hours at a reaction temperature of 570° C., a propionitrile to the nitrogen ratio of 9:60, and a linear velocity of 60 cm./sec.

The reaction results were: propionitrile conversion: 23.2%, acrylonitrile one pass yield: 20.4% and acrylonitrile selectivity: 88.0%.

After reacting of 100 hours, the catalyst employed was continuously withdrawn, while continuing the propionitrile dehydrogenation, and same was regenerated by introduction of air at 570° C. in a flow regeneration apparatus, and was then continuously fed again to the reactor. In this case, the amount of the regenerated catalyst was 2% per hour based on the total amount of the catalyst.

The reaction results in the above case were: propionitrile conversion: 21.8%, acrylonitrile one pass yield: 19.2% and acrylonitrile selectivity: 88.1%. The reaction was continued for about 200 hours and no diminution in the activity of the catalyst was observed.

EXAMPLE 10

0.02 mole of each of the stannous halides shown in Table 1 were charged, respectively, in the flasks as described in Example 7, and were each dissolved in 100 ml. of various organic solvents shown in said table. To each of the resulting solutions, 50 ml. of the same silica gel as in Example 5 were added and same was heated and reacted, with stirring, under varying conditions. After completion of the reaction, the solvents were removed and the silica gel reaction products were washed with the respective solvents by decantation. To each of the silica gel reaction products, 100 ml. of an aqueous alkali solution was added, and the mixture was heated and reacted, with stirring on a water bath. After drying, the reaction mixtures were thermally treated at 560° C. for 3 hours in nitrogen current to prepare a catalyst for propionitrile dehydrogenation. Using the various stannous oxide-silica catalysts thus prepared, the dehydrogenation of propionitrile was effected. Results of the respective reactions are set out in Table 1. In each case, the reaction conditions employed were a reaction temperature of 560° C., a propionitrile to nitrogen ratio of 9:60 and a space velocity of 1400 hr.$^{-1}$.

TABLE 1

| Experiment No.: | Tin salt | Organic solvent | Aqueous alkali solution | Catalyst preparation conditions | | | Reaction results | | |
|---|---|---|---|---|---|---|---|---|---|
| | | | | Temperature, °C. | Time, hr. | Procedure | Propionitrile conversion, percent | Acrylonitrile one pass yield, percent | Acrylonitrile selectivity, percent |
| 1 | SnCl$_2$ | Benzophenone | NH$_4$OH | 200 | 3 | Same as in Example 5 | 19.5 | 17.5 | 89.8 |
| 2 | SnCl$_2$ | Acetone | NH$_4$OH | 50 | 8 | do | 22.3 | 19.8 | 88.8 |
| 3 | SnCl$_2$ | Phenyl acetate | KOH | 180 | 5 | Same as in Example 7 | 21.3 | 18.5 | 87.0 |
| 4 | SnCl$_2$ | Isoamyl butyrate | NaOH | 150 | 5 | do | 21.4 | 18.7 | 87.4 |
| 5 | SnCl$_2$ | Dioxane | Na$_2$CO$_3$ | 100 | 7 | do | 22.5 | 18.8 | 83.7 |
| 6 | SnCl$_2$ | Anisole | KHCO$_3$ | 130 | 6 | do | 19.6 | 17.4 | 88.9 |
| 7 | SnBr$_2$ | Acetophenone | NH$_4$OH | 150 | 4 | Same as in Example 5 | 21.8 | 18.4 | 84.3 |
| 8 | SnBr$_2$ | Anisole | K$_2$CO$_3$ | 130 | 6 | Same as in Example 7 | 22.8 | 20.6 | 90.5 |
| 9 | SnBr$_2$ | Propyl acetate | NaHCO$_3$ | 90 | 5 | do | 19.7 | 17.2 | 87.5 |
| 10 | SnBr$_2$ | Ethyl butyrate | Ca(OH)$_2$ | 110 | 5 | do | 20.8 | 18.5 | 88.9 |
| 11 | SnBr$_2$ | Methylethylketone | NH$_4$OH | 70 | 7 | Same as in Example 5 | 21.5 | 18.7 | 87.1 |
| 12 | SnCl$_2$ | Benzyl acetate | NaOH | 180 | 4 | Same as in Example 7 | 22.3 | 19.5 | 87.9 |
| 13 | SnI$_2$ | do | NH$_4$OH | 180 | 4 | Same as in Example 5 | 21.2 | 18.5 | 87.3 |
| 14 | SnI$_2$ | Dioxane | Na$_2$CO$_3$ | 90 | 6 | Same as in Example 7 | 20.8 | 18.8 | 90.3 |
| 15 | SnI$_2$ | Isobutyl acetate | K$_2$CO$_3$ | 130 | 5 | do | 22.0 | 19.5 | 88.8 |

Each of the reactions was effected for about 200 hours, and when the catalyst had been diminished in activity, each catalyst was regenerated wtih O$_2$, air, steam or carbon dioxide. After regeneration, the acrylonitrile formation-activity and selectivity of the respective catalysts were completely restored.

EXAMPLE 11

3 ml. of a stannous oxide-silica catalyst prepared according to the bonding method in the same manner as in Example 5 were charged to a quartz-glass reaction tube. The reaction tube was heated to 600° C. in a tubular electric furnace and then a mixed gas comprising 36.0% of isobutyronitrile and 54.0% of nitrogen was fed to the reaction tube at a space velocity of 1400 hr.$^{-1}$.

The reaction results after 60 minutes from the commencement of the reaction at 600° C. were isobutyronitrile conversion: 16.0%, methacrylonitrile one pass yield: 12.4% and methacrylonitrile selectivity: 77.5%. The reaction results hardly changed even after 80 hours had elapsed from the commencement of the reaction and no diminution in catalyst activity was observed.

The dehydrogenation of isobutyronitrile was continued for 150 hours and, when the catalyst activity had been lowered, the feeding of isobutyronitrile was discontinued and air was introduced at 600° C. and a rate of 40 ml./min. When air had been introduced for about 2.5 hours, the formation of carbon dioxide ceased and the introduction of air was discontinued and the dehydrogenation of isobutyronitrile was again effected under the same reaction conditions as above.

The reaction results after the regeneration of catalyst were: an isobutyronitrile conversion: 16.7%, methacrylonitrile one pass yield: 11.8% and methacrylonitrile selectivity: 75.1%.

EXAMPLE 12

Results of dehydrogenation of propionitrile before and after regeneration treatment, and catalyst lives, of (I) a stannous oxide catalyst, (II) a stannous oxide-silica gel catalyst prepared according to the immersion method and (III) a stannous oxide-silica catalyst prepared according to the bonding method are shown in comparison in the following Table 2:

TABLE 2

| Control example | Catalyst | Reaction condition | | Reaction results after 30 minutes from initiation of reaction | | | Catalyst life, hrs. | Regeneration treatment conditions | Reaction results after regeneration treatment | | |
|---|---|---|---|---|---|---|---|---|---|---|---|
| | | Temp., °C. | S.V., hr.$^{-1}$ | Propionitrile conversion, percent | Acrylonitrile one pass yield, percent | Acrylonitrile selectivity, percent | | | Propionitrile conversion, percent | Acrylonitrile one pass yield, percent | Acrylonitrile selectivity, percent |
| 1 (Example 1) | (I) | 530 | 9,000 | 23.8 | 20.0 | 83.5 | 2 | Air was introduced at 530° C. for 1 hour. | 28.6 | 19.6 | 68.3 |
| 2 (Example 4) | (II) | 550 | 1,400 | 26.7 | 23.4 | 87.5 | 30 | Air was introduced at 550° C. for 1.5 hours. | 25.8 | 22.1 | 85.6 |
| 3 (Example 5) | (III) | 560 | 1,400 | 19.5 | 17.1 | 87.5 | 100 | Air was introduced at 560° C. for 2 hours. | 20.3 | 17.8 | 87.8 |
| 4 (Example 6) | (III) | 560 | 1,400 | 21.3 | 18.8 | 88.4 | 120 | ___do___ | 28.0 | 18.2 | 87.6 |

What we claim is:

1. A process for the preparation of acrylonitrile or methacrylonitrile, said process comprising contacting propionitrile or isobutyronitrile respectively in the gaseous phase at a temperature between 300° C. and 700° C. with a stannous oxide-silica complex catalyst; said stannous oxide-silica complex catalyst being prepared by reacting a stannous halide with silica gel in an organic solvent at a temperature between 30° C. and 350° C. to form a reaction product, washing the reaction product with said organic solvent, hydrolyzing the washed reaction product with an aqueous alkaline solution, removing the alkali and subjecting the reaction product to heat treatment at a temperature between 300° C. and 700° C. to obtain the catalyst in an atmosphere of an inert gas.

2. A process as claimed in claim 1, wherein the organic solvent in which the stannous halide and silica gel are reacted is selected from the group consisting of esters, ketones and ethers.

3. A process as claimed in claim 1, wherein the contacting is effect under a reduced pressure.

4. A process as claimed in claim 1, wherein the contacting is effected at a space velocity of 20–100,000 hr.$^{-1}$.

5. A process as claimed in claim 1 wherein the contacting is effected while regenerating the deteriorated catalyst by discontinuing the supply of propionitrile or isobutyronitrile, treating the catalyst with at least one member of the group consisting of oxygen, air, steam and carbon dioxide at a temperature of 250° to 700° C. and restoring the supply of propionitrile or isobutyronitrile.

6. A process as claimed in claim 1 wherein the contacting is effected while regenerating the deteriorated catalyst by withdrawing said catalyst continuously from the reaction reactivating the withdrawn catalyst by treating same with at least one member of the group consisting of oxygen, air, steam and carbon dioxide at a temperature of 250° to 700° C. and continuously recycling the reactivated catalyst to the reaction.

References Cited

UNITED STATES PATENTS

| 2,385,552 | 9/1945 | Spence et al. | 260—465.9 |
| 2,554,482 | 5/1951 | Brown | 260—465.9 |
| 2,554,484 | 5/1951 | Lodger | 260—465.9 |
| 3,207,805 | 9/1965 | Gray | 260—465.9 XR |
| 3,207,806 | 9/1965 | Bajars | 260—465.9 XR |

JOSEPH P. BRUST, Primary Examiner

U.S. Cl. X.R.

252—454; 260—465.1